United States Patent
Hisada et al.

(10) Patent No.: US 9,636,781 B2
(45) Date of Patent: May 2, 2017

(54) LASER WELDING METHOD

(71) Applicant: TOYOTA JIDOSHA KABUSHIKI KAISHA, Toyota-shi, Aichi-ken (JP)

(72) Inventors: Kohei Hisada, Nagoya (JP); Toru Hioki, Miyoshi (JP); Junichiro Makino, Nagakute (JP); Kazuyuki Ogusu, Okazaki (JP); Masahiro Nakata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 14/715,978

(22) Filed: May 19, 2015

(65) Prior Publication Data

US 2015/0336212 A1 Nov. 26, 2015

(30) Foreign Application Priority Data

May 22, 2014 (JP) ................................ 2014-106061

(51) Int. Cl.
*B23K 26/22* (2006.01)
*B23K 26/082* (2014.01)

(52) U.S. Cl.
CPC ............ *B23K 26/22* (2013.01); *B23K 26/082* (2015.10)

(58) Field of Classification Search
CPC ..................................................... B23K 26/22
USPC ....................................... 219/121.63, 121.64
See application file for complete search history.

(56) References Cited

U.S. PATENT DOCUMENTS

| 4,015,100 | A | 3/1977 | Gnanamuthu et al. |
|---|---|---|---|
| 2003/0150842 | A1 | 8/2003 | Mikame |
| 2005/0028897 | A1 | 2/2005 | Kurz et al. |
| 2013/0168371 | A1 | 7/2013 | Furusako et al. |
| 2014/0377578 | A1* | 12/2014 | Hisada ................... B23K 26/22 428/594 |
| 2015/0104243 | A1* | 4/2015 | Watanabe ............... B23K 11/11 403/271 |
| 2015/0174702 | A1* | 6/2015 | Fujimoto .............. B23K 11/115 428/594 |

FOREIGN PATENT DOCUMENTS

| EP | 2 628 563 A1 | 8/2013 |
|---|---|---|
| JP | H091341 A | 1/1997 |
| JP | 2001-062575 A | 3/2001 |
| JP | 2007-253179 A | 10/2007 |
| JP | 2013-132686 A | 7/2013 |
| KR | 1020130052013 A | 5/2013 |

(Continued)

*Primary Examiner* — Samuel M Heinrich
(74) *Attorney, Agent, or Firm* — Oliff PLC (57) ABSTRACT

A laser welding method includes: projecting a laser beam onto irradiation regions on plural metallic workpieces such that a weld section is formed when the workpieces are joined by laser welding, the weld section being formed of plural nuggets, and each of the irradiation regions being formed with each of the nuggets. The nuggets are sequentially formed by sequentially projecting the laser beam onto the irradiation regions that respectively correspond to the nuggets. The laser beam is projected onto each of the irradiation regions such that an amount of input heat from the laser beam that is projected onto each of the irradiation regions to the workpiece is reduced as the nuggets are sequentially formed.

4 Claims, 10 Drawing Sheets

(56) References Cited

FOREIGN PATENT DOCUMENTS

| WO | 2012/050097 A1 | 4/2012 |
| WO | 2013/052034 A1 | 4/2013 |
| WO | 2013/098621 A1 | 7/2013 |

\* cited by examiner

LASER WELDING METHOD

The disclosure of Japanese Patent Application No. 2014-106061 filed on May 22, 2014 including the specification, drawings and abstract is incorporated herein by reference in its entirety.

BACKGROUND OF THE INVENTION

1. Field of the Invention

The invention relates to a laser welding method that is suitable for joining plural workpieces by welding with a laser beam.

2. Description of Related Art

A laser welding method has widely been used as a method for joining plural metallic workpieces in a state that the workpieces are stacked or abutted. Welding by the laser welding method has the following advantages: less process distortion, capability of high-speed welding, a smaller portion that is influenced by residual heat, and the like.

As such a technique, for example, Japanese Patent Application Publication No. 2013-132686 (JP 2013-132686 A) suggests a laser welding method for joining workpieces that are formed of stacked plural steel sheets. Here, a laser beam is projected onto the workpieces to join the workpieces such that a weld section composed of plural nuggets is formed, so as to join a workpiece W1.

Figure 10A:
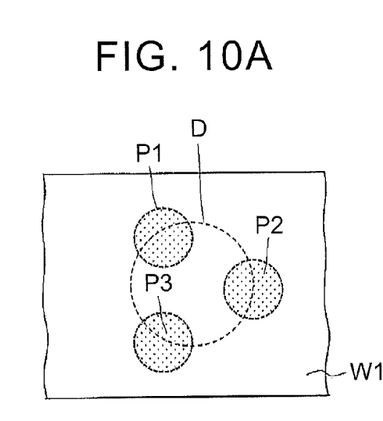
FIG. 10A is a view for illustrating a laser welding method according to the related art and shows a virtual closed curve on a workpiece before a laser beam is projected thereon and irradiation regions of a first laser beam.

More specifically, as shown in FIG. 10A, the laser beam is projected onto irradiation regions P1 to P3 that are in the same shape and located on a closed curve D such that each of the nuggets is formed along a circumference that is a virtual closed curve D. It is possible to increase reliability of welding of the workpieces by adopting such a laser welding method.

Figure 10B:
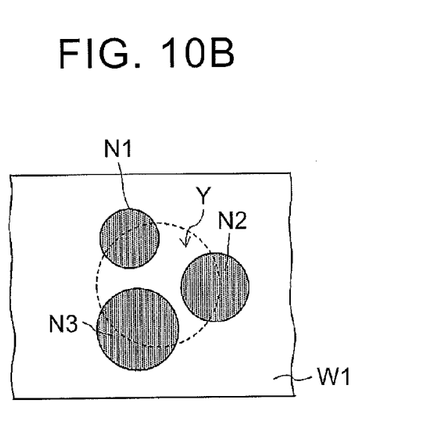
FIG. 10B is a view for illustrating the laser welding method according to the related art and shows states of nuggets.

As indicated in JP 2013-132686 A, when a weld section Y that includes nuggets N1 to N3 is formed, the nuggets N1, N2, N3 are sequentially formed. However, as the nuggets N1, N2, N3 are sequentially formed, as shown in FIG. 10B, size of the nugget tends to increase in an order of the nuggets N1 to N3. Consequently, there is a case where the weld section Y in a stable shape cannot be obtained. In particular, such a phenomenon is even more prominent in the case where a large number of the nuggets are sequentially formed in the vicinity of each other or where it is intended to sequentially form the plural nuggets at a high speed.

SUMMARY OF THE INVENTION

The invention provides a laser welding method that can suppress fluctuation in size of nuggets and stabilize welding of workpieces in the case where the nuggets are sequentially formed by projecting a laser beam thereon, so as to form a weld section that includes the plural nuggets.

Figure 10C:
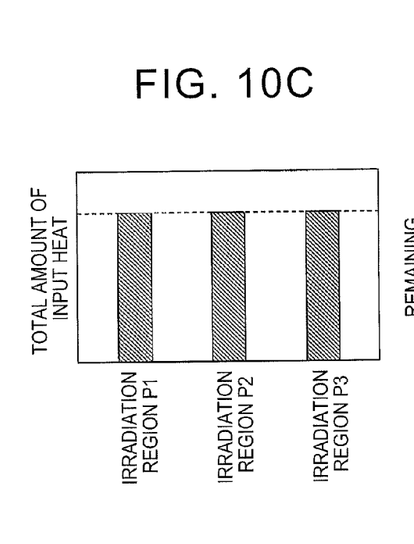
FIG. 10C is a view for illustrating the laser welding method according to the related art and shows a relationship between each of the irradiation regions and a total amount of input heat thereto.

As a result of earnest investigations, the inventors have reached the following findings. In the case where the same condition for forming a nugget is applied to each of the nuggets when the plural nuggets are sequentially formed, for example, as shown in FIG. 10C, a total amount of heat (a total amount of input heat) that is input to each of irradiation regions by the laser beam is the same.

Figure 10D:
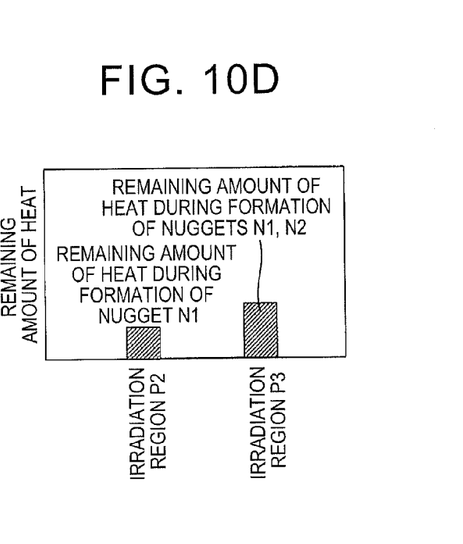
FIG. 10D is a view for illustrating the laser welding method according to the related art and a view for illustrating a remaining amount of the heat.

For example, as shown in FIG. 10A, it is considered that, when the nuggets N1 to N3 are sequentially formed in the order of irradiation regions P1 to P3, the nugget that is formed subsequently (for example, the nugget N2) is influenced by the heat of the laser beam that is input when the nugget is formed previously (for example, when the nugget N1 is formed). In other words, when the laser beam is projected onto the irradiation region P2 to form the nugget N2, as shown in FIG. 10D, remaining heat in the workpiece by the laser beam that is projected when the nugget N1 is formed previously is added. Similarly, when the laser beam is projected onto the irradiation region P3 to form the nugget N3, the remaining heat in the workpiece by the laser beam that is projected when the nuggets N1, N2 are formed previously is added. As a result, it is found that the size of the subsequent nuggets is increased in order.

The invention is based on such new findings by the inventors. A first aspect of the invention relates to a laser welding method. The laser welding method includes: projecting a laser beam onto irradiation regions of each of plural metallic workpieces such that a weld section is formed when the workpieces are joined by laser welding, the weld section being formed of plural nuggets, and the irradiation regions being respectively formed with the nuggets. Then, the nuggets are sequentially formed by sequentially projecting the laser beam onto the irradiation regions that respectively correspond to the nuggets. The laser beam is projected onto each of the irradiation regions such that an amount of input heat from the laser beam required for forming the nuggets to the workpieces is reduced as the nuggets are sequentially formed.

According to the above aspect of the invention, the plural metallic workpieces are joined by the laser welding. At this time, the laser beam is projected onto each of the irradiation regions on a surface of at least one of the workpieces such that the weld section in which parts of the workpieces are melted is formed of the plural nuggets. More specifically, when the weld section formed of the plural nuggets is formed, the laser beam is projected intermittently such that the nuggets are sequentially formed by irradiation of the laser beam.

At this time, the input heat of the laser beam during formation of the nugget remains in the workpiece when the next nugget is formed. Thus, in the invention, this remaining heat is taken into consideration, and the laser beam is projected onto each of the irradiation regions such that the amount of input heat from the laser beam, which is projected onto each of the irradiation regions, to the workpiece (the amount of input heat required for forming each of the nuggets), is reduced as the nuggets are sequentially formed.

Accordingly, in the case where the remaining amount of heat in the workpiece by the laser beam during the formation of the previous nugget is added to the irradiation region for forming the next nugget when the plural nuggets are sequentially formed, the following amount of input heat from the laser is smaller than the previous amount of input heat from the laser. Thus, total amounts of heat in the irradiation regions can approximate each other. In this way, fluctuation in size of these nuggets is suppressed, and welding of the workpieces can thus be stabilized.

Furthermore, in the above aspect of the invention, the remaining amount of heat in the workpiece by the laser beam during the formation of the previous nugget is effectively used to form the next nugget. Thus, excessive irradiation of the laser beam onto the workpiece can be suppressed.

In the above aspect, the laser beam may be projected such that the plural nuggets are formed along a virtual closed curve. According to this aspect, the plural nuggets are formed by sequentially projecting the laser beam onto the plural irradiation regions that are along the virtual closed curve. Thus, compared to a case where an entire region within the virtual closed curve is melted, the weld section in a stable shape can be obtained by using a smaller amount of heat.

Furthermore, the laser beam is projected such that the nuggets are separated from each other along the closed curve. Then, the laser beam may be projected such that the nugget is further formed on the closed curve between the two adjacent nuggets.

According to this aspect, the laser beam is projected such that the nuggets are separated from each other along the closed curve. Then, the laser beam is projected onto the irradiation regions, so as to form the nugget between the two adjacent nuggets. At this time, the remaining amount of heat in each of these irradiation regions is reduced by dissipation of heat. In this way, compared to a case where the nuggets are sequentially formed on the closed curve in a successive manner, the nuggets in the same size can easily be formed.

Furthermore, a process in which the laser beam is projected to form the nuggets is set as a first laser beam irradiation process. The irradiation of the laser beam further includes a second laser beam irradiation process that is performed after the first laser beam irradiation process and before the nugget is solidified and in which the laser beam is projected onto the nugget in a melted state, so as to delay the progression of solidification in a direction from a peripheral edge toward center of the nugget.

According to this aspect, in the first laser beam irradiation process, the nugget (a molten pool) in which the workpiece in the irradiation region is melted is formed by projecting the first laser beam onto the irradiation region. At this time, the heat in the nugget in the melted state (the molten pool) is more likely to be dissipated from the peripheral edge thereof than from the center. Thus, the solidification starts from the peripheral edge of the nugget and progresses toward the center. A solidification rate (that is, a cooling rate) from start of solidification of the center of the nugget to complete solidification thereof is higher than the solidification rate (the cooling rate) of the peripheral edge of the nugget. As a result, solidification shrinkage of the center of the nugget is completed before being compensated by liquid-phase flow of the nugget. This possibly causes generation and extension of a crack that starts from the center of the solidified nugget or the vicinity thereof.

In view of the above, in the above aspect of the invention, the second laser beam is projected onto this nugget in the melted state in the second laser beam irradiation process. Accordingly, the progression of the solidification in a direction from the peripheral edge of the nugget toward the center of the nugget in the melted state is delayed.

In this way, the solidification shrinkage at the center of the nugget in the melted state is compensated by the liquid-phase flow. Thus, it is possible to suppress generation of the crack in the vicinity of the center of the nugget. Furthermore, a fluctuation in the solidification rate (the cooling rate) from the peripheral edge to the center of the nugget in the melted state is suppressed, and thus the nugget in the melted state can be solidified to have a further uniform structure. Noted that the "center of the nugget in the melted state" refers to a part of the nugget in the melted state that is solidified in the end. For example, when the nugget is circular, the center of the nugget refers to the vicinity of the center of a circle.

According to the above aspect of the invention, even when the nuggets are sequentially formed by projecting the laser beam, so as to form the weld section that includes the plural nuggets, the fluctuation in size of these nuggets can be suppressed, and thus welding of the workpieces can be stabilized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A to 2D are schematic views of one example of a first laser beam irradiation process according to the laser welding method of the first embodiment, in which FIG. 2A to FIG. 2D show that a first laser beam is projected onto the workpieces in order;

FIGS. 6A to 6E are schematic views for illustrating the second laser beam irradiation process according to the laser welding method of the third embodiment, FIG. 6A to FIG. 6D show that a second laser beam is projected onto the workpieces in order, and FIG. 6E shows the nugget after irradiation of the second laser beam;

DETAILED DESCRIPTION OF EMBODIMENTS

A laser welding method according to some embodiments of the invention will be described below.

First Embodiment

1. Regarding a Device Configuration

Figure 1A:
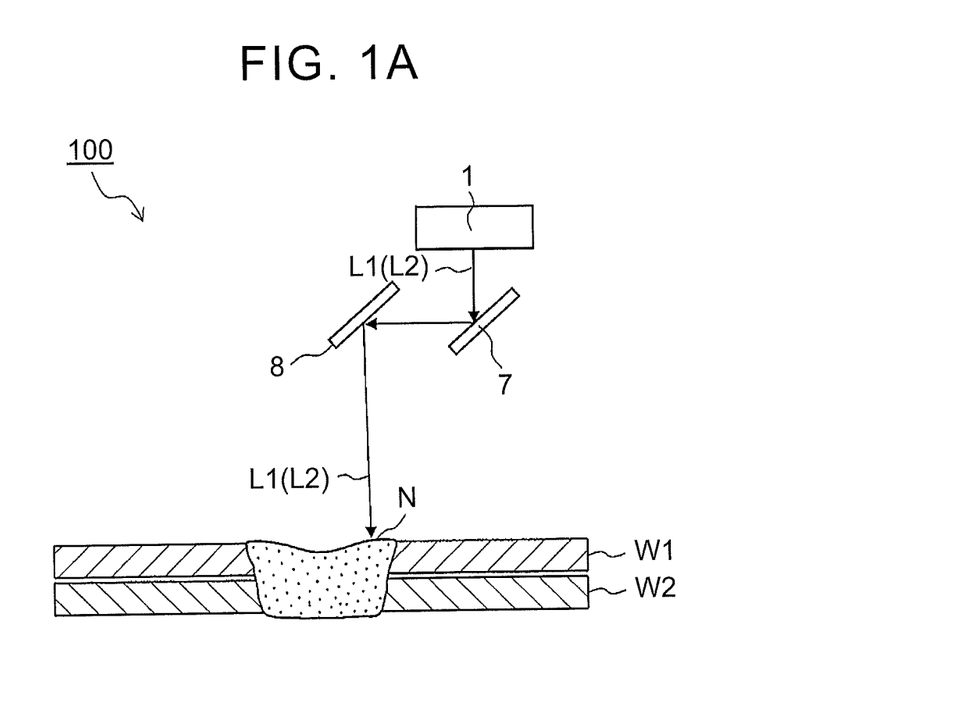
FIG. 1A is a schematic view of one example of a welding device for implementing a laser welding method according to first to third embodiments of the invention and is a view of a welded state in a lateral direction.
Figure 1B:
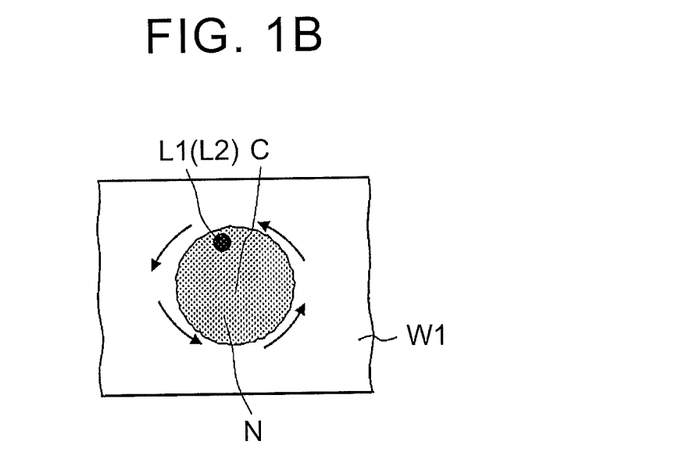
FIG. 1B is a schematic view of the one example of the weld device for implementing the laser welding method according to the first to third embodiments of the invention and is a view of the welded state in a front direction.

FIG. 1 is a schematic view of one example of a welding device for implementing laser welding methods according to the first to the third embodiments of the invention. FIG. 1A is a view of a welded state of a nugget in a lateral direction, and FIG. 1B is a view of the welded state of the nugget in a front direction.

The welding device shown in FIG. 1 includes a laser beam irradiation section 1 as a main component. The laser beam irradiation section 1 is a device that provides a laser beam for welding (first or second laser beams) L1, L2 and projects the selected laser beam onto two metallic workpieces W1, W2 that are stacked or arranged with a slight gap interposed therebetween.

In this embodiment and the second embodiment, only the laser beam for welding (the first laser beam L1) used to form each nugget N that constitutes a weld section is used. In the third embodiment, in addition to the first laser beam L1, the laser beam for welding (the second laser beam L2) used to prevent a crack of the nugget N is also used.

In the first to third embodiments, the two workpieces W1, W2 are stacked and welded. However, the number of the workpieces is not limited to two.

For example, the two workpieces may be subject to butt welding or fillet welding in a method, which will be described below.

In addition, as a material of the workpieces W1, W2, a material that can easily be cracked during laser welding, such as aluminum alloy or high-carbon steel, is further effective. A columnar crystal structure and an equiaxed crystal structure are likely to be formed in any of these materials by welding, which will be described below, and a crack is easily generated at the center of the nugget. However, such a problem can be solved by performing laser welding shown in the third embodiment and a modified example thereof, which will be described below.

The first or second laser beam L1, L2, which will be described below, is sequentially reflected by driven mirrors 7, 8 as optical systems and projected with respect to the two workpieces W1, W2. Here, the driven mirrors 7, 8 are controlled to be driven so that a direction of reflection of the first or second laser beam L1, L2 incident on the driven mirrors 7, 8 is controlled and that the first or second laser beam L1, L2 is projected onto a desired position. This beam can be scanned in a trajectory (for example, in a circular shape or a helical shape) that is set in advance as shown in FIG. 1B, for example. The driven mirrors 7, 8 are further controlled to be driven so that, for example, the first or second laser beam L1, L2 moves to each of the irradiation regions shown in FIG. 3A and FIG. 4A, which will be described below, and can be scanned in the above-described trajectory that is set in advance in each of the irradiation regions. The workpieces W1, W2 are joined by laser welding using such a laser welding device 100.

2. Regarding Formation of Nuggets (First Laser Beam Irradiation Process)

In this embodiment, the two metallic workpieces W1, W2 are welded (joined) by the first laser beam L1. At this time, in such a manner that a weld section that includes plural nuggets is formed (see FIG. 3D, FIG. 4C, and the like, which will be described below, for example), the laser beam is projected onto each of the irradiation regions in the workpieces, in which a nugget is formed. Then, the workpieces W1, W2 are joined. Here, a method for forming each of the nuggets will be described first in detail with reference to FIG. 2.

FIG. 2 includes schematic views of one example of a first laser beam irradiation process according to the laser welding method of the first embodiment, in which FIG. 2A to FIG. 2D show that the first laser beam is projected onto the workpieces in order.

In this embodiment, portions of the workpieces are set as a irradiation region P, and the first laser beam L1 is projected onto the irradiation region P. In this way, a nugget N in which the workpieces in the irradiation region P are melted, is formed.

Figure 2A:
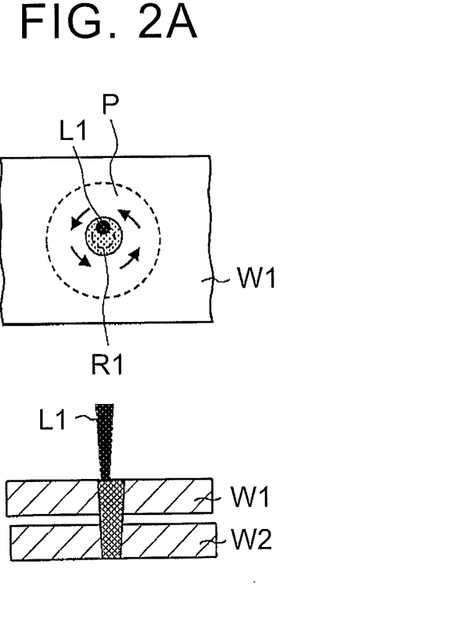

More specifically, in this embodiment, as shown in FIG. 2A, the first laser beam L1 is scanned on a circumference R1 such that the first laser beam L1 circles around the center of the irradiation region P, and melts the workpieces in the circumference R1 of the irradiation region P and the vicinity thereof.

Figure 2B:
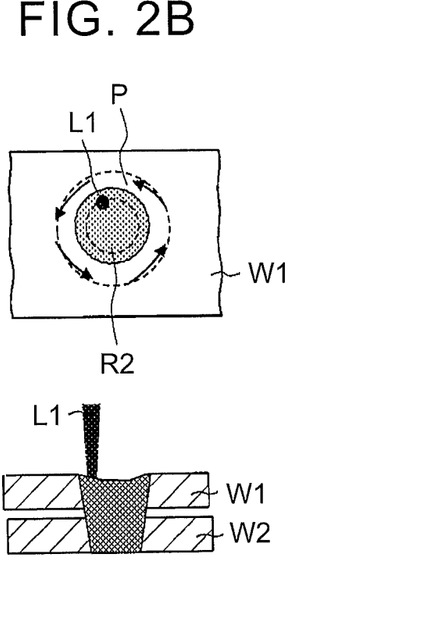

Next, as shown in FIG. 2B, the first laser beam L1 is scanned on a circumference R2, a radius of which is larger than that of the circumference R1, such that the first laser beam L1 circles around the center of the irradiation region P, and melts the workpieces in the circumference R2 of the irradiation region P and the vicinity thereof.

Figure 2C:
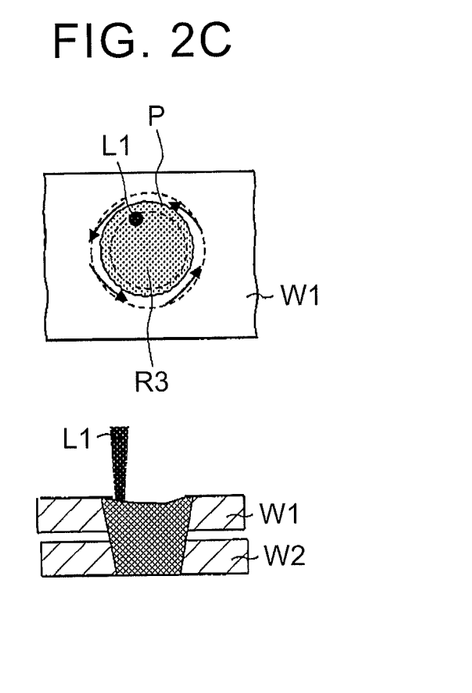

Furthermore, as shown in FIG. 2C, the first laser beam L1 is scanned on a circumference R3, a radius of which is larger than that of the circumference R2, such that the first laser beam L1 circles around the center of the irradiation region P, and melts the workpieces in the circumference R3 of the irradiation region P and the vicinity thereof. Lastly, as shown in FIG. 2D, the first laser beam L1 is scanned on a circumference R4, a radius of which is larger than that of the circumference R3, such that the first laser beam L1 circles around the center of the irradiation region P, and melts the workpieces in the circumference R4 of the irradiation region P and the vicinity thereof.

Just as described, the first laser beam L1 circles around the center of the irradiation region P toward a circumferential edge of the irradiation region P, and the material in the region is melted by the first laser beam L1. In this way, the workpiece W1 can be formed with a nugget that is in a circular shape when seen in an irradiation direction of the laser beam.

Figure 2D:
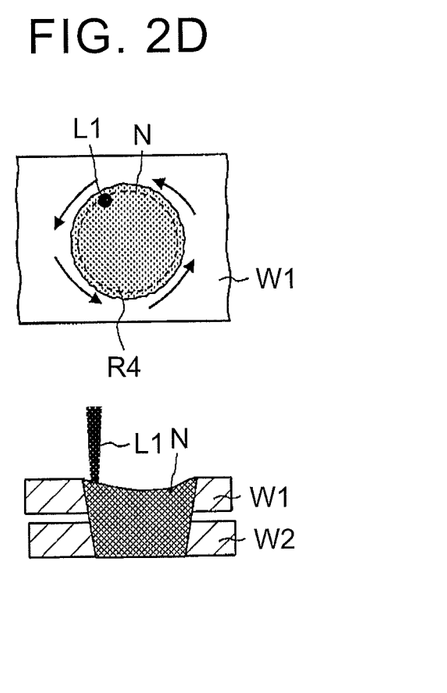

Noted that a method for forming a nugget shown in FIGS. 2A to 2D is merely one example. Thus, a method for projecting the first laser beam L1 is not particularly limited as long as the plural nuggets can be formed under a heat input condition, which will be described below. For example, the circular nugget may be formed by projecting the first laser beam L1 at a same location (for example, the center of the irradiation region P) for a certain time period. In addition, instead of projecting the first laser beam L1 as shown in FIGS. 2A to 2C, the first laser beam L1 may be projected (scanned) only on the circumference R4 of the irradiation region P, which is shown in FIG. 2D, so as to form a ring-shaped nugget. Then, after this ring-shaped nugget is formed, the first laser beam L1 may be projected such that parts of the workpieces in a region inside the circumference R4 are melted.

3. Regarding Formation of the Weld Section (Plural Nuggets)

Figures 3A, 3B:
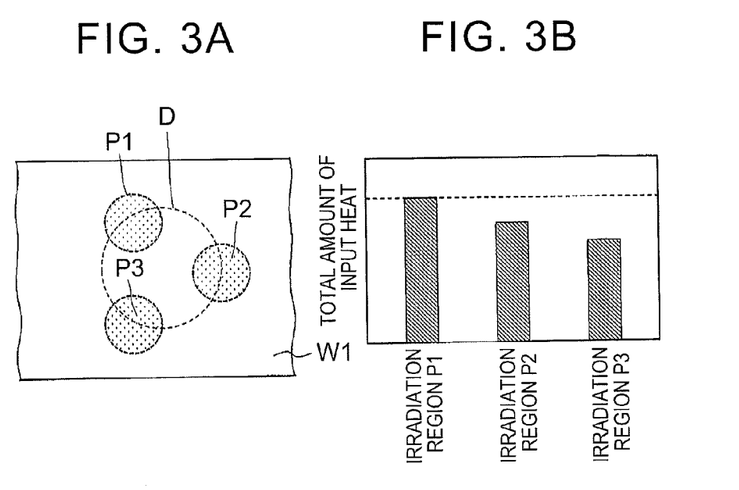
FIG. 3A is a view for illustrating the laser welding method according to the first embodiment and shows a virtual closed curve on the workpiece before the first laser beam is projected thereon and irradiation regions of the first laser beam.
FIG. 3B is a view for illustrating the laser welding method according to the first embodiment and shows a relationship between each of the irradiation regions and a total amount of input heat thereto.
Figure 3C:
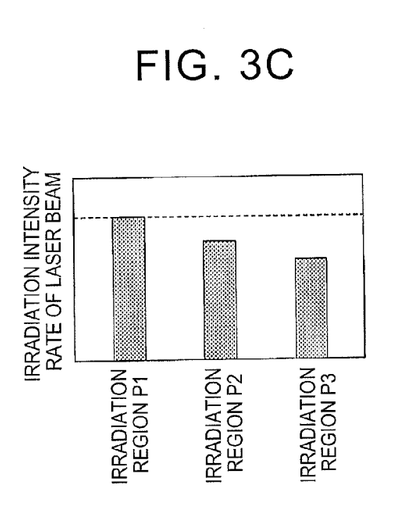
FIG. 3C is a view for illustrating the laser welding method according to the first embodiment and shows a relationship between the irradiation regions and an irradiation intensity ratio.
Figure 3D:
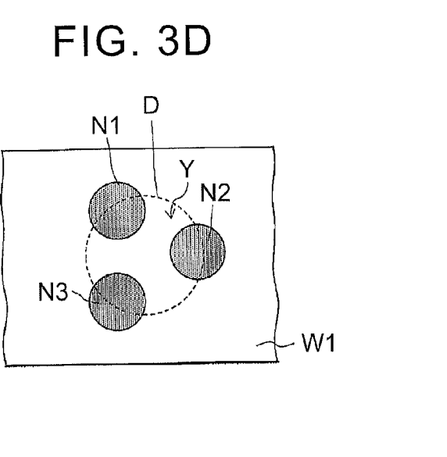
FIG. 3D is a view for illustrating the laser welding method according to the first embodiment and shows states of nuggets.

FIG. 3 includes views for illustrating the laser welding method according to the first embodiment, in which FIG. 3A shows a virtual closed curve on the workpiece before the first laser beam is projected thereon and irradiation regions of the first laser beam, FIG. 3B shows a relationship between each of the irradiation regions and a total amount of input heat thereto, FIG. 3C shows a relationship between the irradiation regions and an irradiation intensity ratio, and FIG. 3D shows states of the nuggets.

In this embodiment, as shown in FIG. 3D, when the weld section Y that includes three nuggets N1 to N3 is formed, the first laser beam L1 is sequentially projected onto irradiation regions P1 to P3 that respectively correspond to each of the nuggets. In this way, the nuggets N1 to N3 are sequentially formed.

More specifically, center of a circle that passes through the irradiation regions P1 to P3 (the nuggets N1 to N3) is determined, so as to set an outer peripheral diameter of a virtual closed curve D that corresponds to a circumference. Then, the first laser beam L1 is projected onto the three (plural) irradiation regions P1 to P3, which are set, in order by following procedures shown in FIGS. 2A to 2D. In this way, the nuggets N1 to N3 are sequentially formed in order. In this embodiment, the closed curve D is a circle. However, a shape of the closed curve D is not particularly limited as long as it is a closed curve, and it may be an ellipse or the like.

In this embodiment, the first laser beam L1 is sequentially projected onto the irradiation regions P1, P2, P3 such that an amount of the input heat from the first laser beam L1, which is projected onto the irradiation regions P1, P2, P3, to the workpiece W1 is reduced as shown in FIG. 3B, as the nuggets N1 to N3 are sequentially formed in order (that is, as the first laser beam L1 is projected onto the irradiation regions P1 to P3 in order).

More specifically, as shown in the following table 1 and FIG. 3C, a radius of a circumference on which the first laser beam L1 is scanned, a scanning speed of the first laser beam L1, and irradiation intensity of the first laser beam L1 are set for each of the circumferences R1 to R4, which are shown in FIGS. 2A to 2D. In this embodiment, the radii and the scanning speeds of the first laser beam L1 for the circumferences R1 to R4 are the same in each of the irradiation regions P1 to P3. In addition, the irradiation intensity of the first laser beam L1 is set to be reduced.

For example, the irradiation intensity of the first laser beam L1 that is projected onto the irradiation region P2 is set by multiplying the irradiation intensity of the first laser beam L1 that is projected onto the irradiation region P1 by a specified rate (more specifically, a reduction rate $\alpha<1$). Then, the first laser beam L1 with such irradiation intensity is projected onto the irradiation region P2. Furthermore, the irradiation intensity of the first laser beam L1 that is projected onto the irradiation region P3 is set by multiplying the irradiation intensity of the first laser beam L1 that is projected onto the irradiation region P2 by the specified rate (more specifically, the reduction rate $\alpha<1$). Then, the first laser beam L1 with such irradiation intensity is projected onto the irradiation region P3.

Just as described, only the reduction rate α is set in consideration of the remaining amount of heat from the formation of the previous nugget. In this way, the irradiation intensity of the first laser beam L1 can easily be reduced in the order of the irradiation intensity of the first laser beam L1 in the irradiation region P1, the irradiation intensity of the first laser beam L1 in the irradiation region P2, and the irradiation intensity of the first laser beam L1 in the irradiation region P3. As a result, the amount of input heat from the first laser beam L1, which is projected onto the irradiation regions P1, P2, and P3, to the workpiece W1 can be reduced in the order of the irradiation region P1, the irradiation region P2, and the irradiation region P3.

TABLE 1

| | | | Irradiation intensity of the first laser beam (W): $\alpha < 1$ | | |
| --- | --- | --- | --- | --- | --- |
| | Radius (mm) | Scanning speed (cm/min) | Irradiation region P1 | Irradiation region P2 | Irradiation region P3 |
| Circumference R1 | r1 | s1 | w1 | w1 × α | w1 × (α)² |
| Circumference R2 | r2 | s2 | w2 | w2 × α | w2 × (α)² |
| Circumference R3 | r3 | s3 | w3 | w3 × α | w3 × (α)² |
| Circumference R4 | r4 | s4 | w4 | w4 × α | w4 × (α)² |

TABLE 1-continued

| | Scanning | Irradiation intensity of the first laser beam (W): α < 1 | | |
|---|---|---|---|---|
| Radius (mm) | speed (cm/min) | Irradiation region P1 | Irradiation region P2 | Irradiation region P3 |
| Total amount of input heat (J) | | E | E × α | E × (α)² |

As a result, in the case where the input heat from the first laser beam L1 during the formation of the nugget N1 remains in the workpiece when the next nugget N2 is formed, the amount of input heat from the first laser beam L1 that is projected onto the irradiation region P2 to the workpiece can be smaller than the amount of input heat from the first laser beam L1 that is projected onto the irradiation region P1 to the workpiece by setting a reduction rate a, which is set in consideration of this remaining heat. As a result, the fluctuation in size of the nuggets N1, N2 can be suppressed by approximating the amounts of heat in the irradiation regions P1, P2 during the formation of these nuggets N1, N2.

Similarly, in the case where the input heat of the first laser beam L1 during the formation of the nuggets N1, N2 remains in the workpiece when the next nugget N3 is formed, the amount of input heat from the first laser beam L1 that is projected onto the irradiation region P3 to the workpiece can be smaller than the amount of input heat from the first laser beam L1 that is projected onto the irradiation region P2 to the workpiece. As a result, the fluctuation in size of the nuggets N1 to N3 can be suppressed by approximating the amounts of heat in the irradiation regions P1 to P3 during the formation of these nugget N1 to N3. Thus, welding of the workpieces W1, W2 can be stabilized.

Furthermore, the subsequent nugget is formed by effectively using the amount of heat that is generated by the first laser beam L1 during the formation of the nugget and remains in the workpiece. Thus, projection of the excessive laser beam onto the workpiece can be suppressed.

Noted that, in the above-described embodiment, the radius and the scanning speed of the first laser beam L1 for the circumferences R1 to R4 are the same in the irradiation regions P1 to P3. In addition, the irradiation intensity of the first laser beam L1 is set to be reduced. In this way, the amounts of input heat from the first laser beam L1 that is projected onto the irradiation regions P1, P2, and P3 to the workpiece W1 are reduced as the nuggets N1, N2, and N3 are sequentially formed.

However, the method is not limited to a method just as described. For example, as shown in Table 2, in the irradiation regions P1 to P3, the radius and the irradiation intensity of the first laser beam L1 for each of the circumferences R1 to R4 may be set to be the same, and the scanning speed of the first laser beam L1 may be increased as the nuggets N1 to N3 are sequentially formed in order (that is, as the first laser beam L1 is projected onto the irradiation regions P1 to P3 in order).

TABLE 2

| | Irradiation intensity of the first laser beam (W) | Radius (mm) | Scanning speed (cm/min): α < 1 | | |
|---|---|---|---|---|---|
| | | | Irradiation region P1 | Irradiation region P2 | Irradiation region P3 |
| Circumference R1 | w1 | r1 | s1 | s1/α | s1/(α)² |
| Circumference R2 | w2 | r2 | s2 | s2/α | s2/(α)² |
| Circumference R3 | w3 | r3 | s3 | s3/α | s3/(α)² |
| Circumference R4 | w4 | r4 | s4 | s4/α | s4/(α)² |
| Total amount of input heat (J) | | | E | E × α | E/(α)² |

In other words, as shown in Table 2, the scanning speed in the irradiation region P2 is set by dividing the scanning speed in the irradiation region P1 by a reduction rate (α<1), and the scanning speed in the irradiation region P3 is set by further dividing the scanning speed in the irradiation region P2 by the reduction rate (α<1). In this way, the amounts of heat from the first laser beam L1 that is projected onto the irradiation regions P1, P2, and P3 to the workpiece W1 can be reduced as the nuggets N1, N2, and N3 are sequentially formed.

Second Embodiment

Figure 4A:
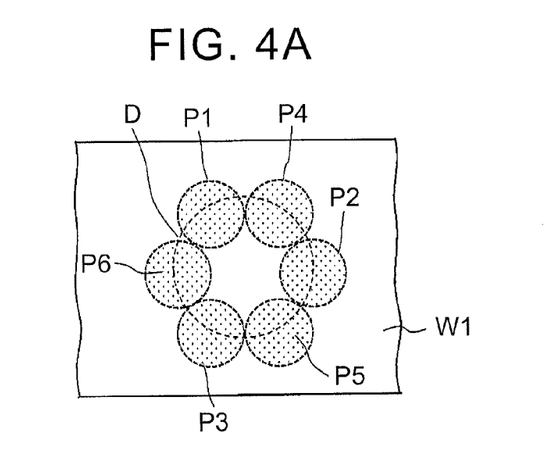
FIG. 4A is a view for illustrating the laser welding method according to the second embodiment and shows a virtual closed curve on the workpiece before the first laser beam is projected thereon and irradiation regions of the first laser beam.
Figure 4B:
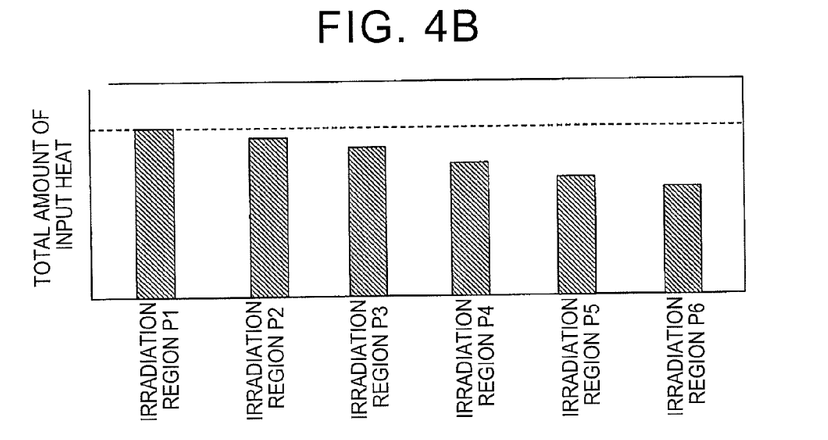
FIG. 4B is a view for illustrating the laser welding method according to the second embodiment and shows a relationship between each of the irradiation regions and a total amount of the input heat thereto.
Figure 4C:
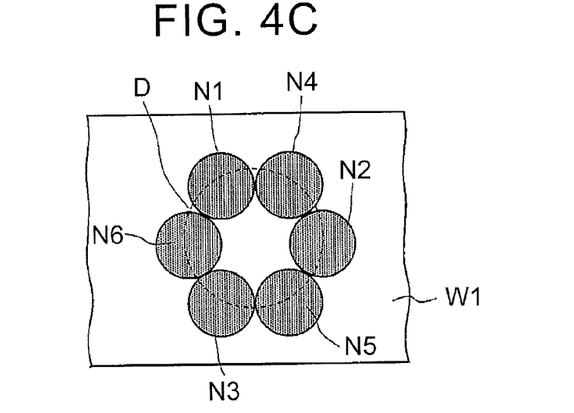
FIG. 4C is a view for illustrating the laser welding method according to the second embodiment and shows states of nuggets.

FIG. 4 includes views for illustrating the laser welding method according to the second embodiment, in which FIG. 4A shows a virtual closed curve on the workpiece before the first laser beam is projected thereon and irradiation regions of the first laser beam, FIG. 4B shows a relationship between each of the irradiation regions and the total amount of input heat, and FIG. 4C shows states of the nuggets.

This embodiment differs from the first embodiment in a point that the first laser beam L1 is projected onto the irradiation regions P1 to P6 in the order as shown in FIG. 4A, so as to form the nuggets N1 to N6 in order.

In this embodiment, as shown in FIG. 4A, center of a circle that passes through the irradiation regions P1 to P6 (the nuggets N1 to N6) is determined, and an outer peripheral diameter of the closed curve D that corresponds to the circumference is set. Then, the first laser beam L1 is projected onto the six (plural) irradiation regions P1 to P6, which are set, in order by following procedures shown in FIGS. 2A to 2D. In this way, the nuggets N1 to N6 are sequentially formed in order.

More specifically, as shown in FIGS. 4A and 4C, the first laser beam is projected onto the irradiation regions P1 to P3 to form the nuggets N1 to N3 such that the nuggets N1 to N3 separate from each other along the closed curve D. Next, the first laser beam L1 is projected onto the irradiation regions P4 to P6 such that each of the nuggets N4 to N6 is further formed on the closed curve D between the two adjacent nuggets of the nuggets N1 to N3.

In other words, the first laser beam L1 is projected onto the irradiation region P4 to form the nugget N4 between the nugget N1 and the nugget N2. The first laser beam L1 is projected onto the irradiation region P5 to form the nugget N5 between the nugget N2 and the nugget N3. The first laser beam L1 is projected onto the irradiation region P6 to form the nugget N6 between the nugget N3 and the nugget N1.

Similar to the first embodiment, also in the embodiment, as shown in FIG. 4B, the first laser beam L1 is projected such that the amount of input heat from the first laser beam L1 that is projected onto the irradiation regions P1 to P6 to the workpiece W1 is reduced as the nuggets N1 to N6 are sequentially formed in order (that is, as the first laser beam L1 is projected onto the irradiation regions P1 to P6 in order), A method for reducing the amount of input heat from the first laser beam L1 that is projected onto the irradiation regions P1 to P6 to the workpiece W1 is the same as the method that has been described with reference to Table 1 and Table 2 of the first embodiment.

According to this embodiment, the first laser beam L1 is projected such that the nuggets N1 to N3 separate from each other along the closed curve D. Then, the laser beam is projected onto the irradiation regions P4 to P6, so as to form each of the nuggets between the two adjacent nuggets of the nuggets N1 to N3. At this time, the remaining amount of heat is reduced in these irradiation regions P4 to P6 due to heat dissipation. In this way, compared to a case where the nuggets are consecutively formed along the closed curve D, the nuggets N1 to N6 in the same size can easily be formed.

Third Embodiment

Figure 5A:
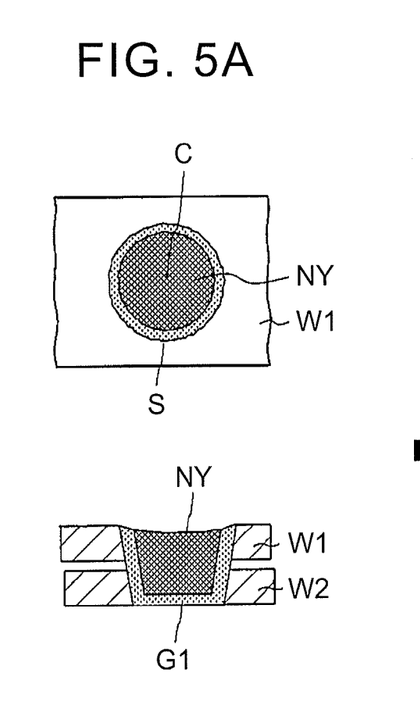
FIGS. 5A and 5B are schematic views of a state in which a nugget in a melted state is cooled without performing a second laser beam irradiation process after the irradiation process shown in FIG. 2, and show the state in which the nugget in the melted state is cooled in the order of FIG. 5A to FIG. 5B.

By the way, in the case where the first laser beam irradiation process shown in FIG. 2 is only performed, as shown in FIG. 5A, the heat is more likely to be dissipated from a peripheral edge S of a nugget NY in a melted state than from the center C. Thus, solidification of the nugget NY in the melted state starts from the peripheral edge S and is proceeded toward the center C in this manner.

Figure 5B:
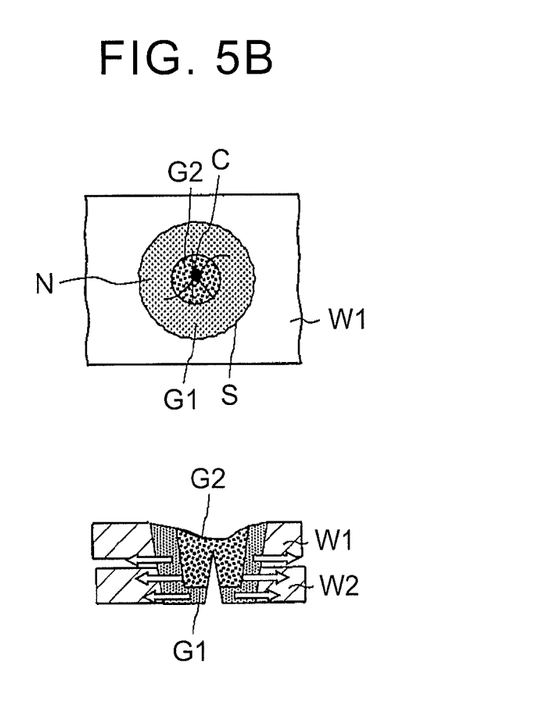

When the above-described material is used, as shown in FIG. 5B, an equiaxed crystal structure G2 (an equiaxed crystal region) is formed to include the center C of the completely solidified nugget N, and a columnar crystal structure (a columnar crystal region) G1 is formed from the peripheral edge S of the nugget N toward the equiaxed crystal region in a manner to surround the equiaxed crystal structure G2 (the equiaxed crystal region).

Here, irrespective of formation of the equiaxed crystal structure and the columnar crystal structure, a solidification rate (that is, a cooling rate) from the start of the solidification of the center C of the nugget NY in the melted state to the complete solidification is higher than a solidification rate (a cooling rate) of the peripheral edge S thereof. As a result, solidification shrinkage of the center C of the nugget in a half-melted state is completed before being compensated by liquid-phase flow at the center C, and the structure is pulled in a circumferential direction. This possibly causes generation and extension of a crack that starts from the center of the nugget N or the vicinity thereof. In view of the above, in a third embodiment, the second laser beam irradiation process, which will be described below, is performed.

4. Regarding the Second Laser Beam Irradiation Process

Figure 6A:
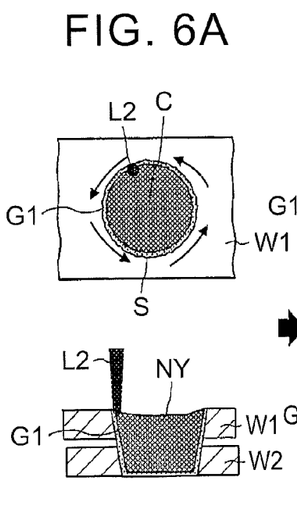
Figures 6B, 6C:
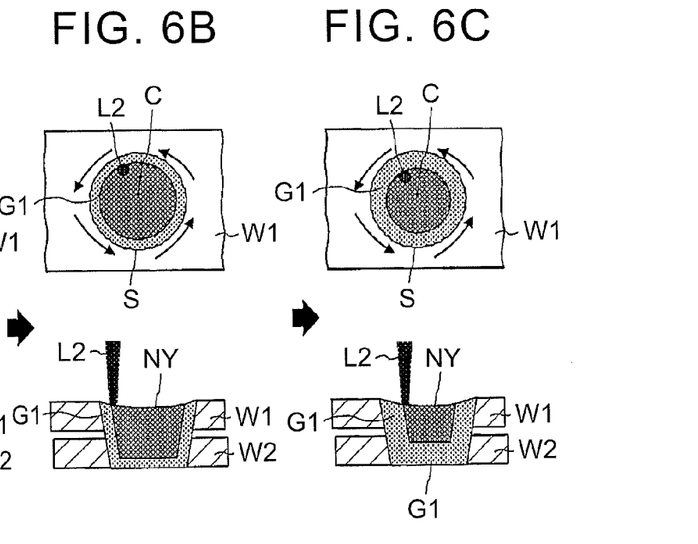
Figure 6D:
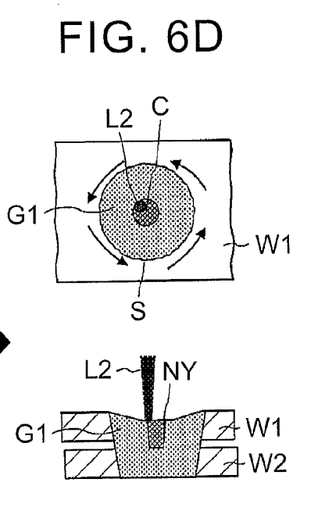
Figure 6E:
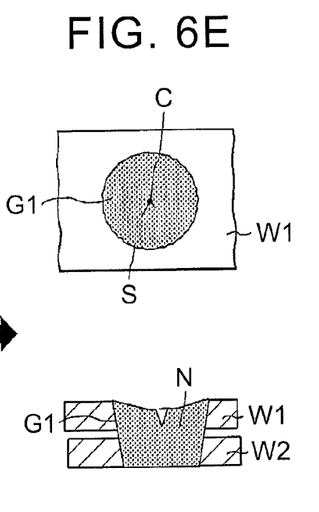

FIG. 6 includes schematic views for illustrating the second laser beam irradiation process according to the laser welding method of the third embodiment, in which FIGS. 6A to 6D show that a second laser beam is projected onto the workpieces in order, and FIG. 6E shows the nugget after irradiation of the second laser beam.

In this embodiment, in the second laser beam irradiation process, the second laser beam L2 is projected onto a melted part of the nugget until the nugget NY in the melted state is solidified. More specifically, the second laser beam L2 circles around the center C from an irradiation start position that is deviated from the center C of the nugget N toward the center C, and then the second laser beam L2 is focused to the center C.

More specifically, as shown in FIG. 6A, in this embodiment, the irradiation start position is located on the peripheral edge S of the nugget NY in the melted state. As shown in FIGS. 6A to 6D, the second laser beam L2 is projected onto the nugget NY in the melted state while circling around the center C from this irradiation start position toward the center C of the nugget N.

Just as described, after the irradiation of the first laser beam, the solidification of the nugget NY in the melted state is progressed from the peripheral edge S toward the center C. However, in this embodiment, the progression of the solidification in a direction from the peripheral edge S of the nugget NY in the melted state toward the center C of the nugget N can be delayed by projecting the second laser beam L2 onto the nugget NY in the melted state.

In this way, a fluctuation in the solidification rate (the cooling rate) from the peripheral edge S to the center C of the nugget N is suppressed so that the nugget N can be solidified to have the further uniform structure. In this embodiment, the solidified nugget N can be formed with the columnar crystal structure G1, in which a columnar crystal extends in a direction from the peripheral edge S toward the center C of the nugget N, can be obtained from the peripheral edge S to the center C.

As a result, in the columnar crystal structure of the nugget N, even when the crack that starts from the center C is generated, the extension of the crack can be reduced. It is because the growth of each of the columnar crystals from the peripheral edge S to the center of the nugget N is intermittent.

Figure 7A:
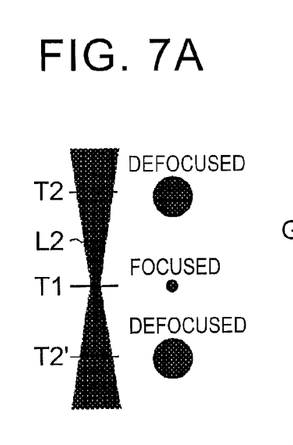
FIG. 7A is a schematic view for illustrating the second laser beam irradiation process according to the laser welding method of a modified example of the third embodiment and a view for illustrating the irradiation of the second laser beam.
Figure 7B:
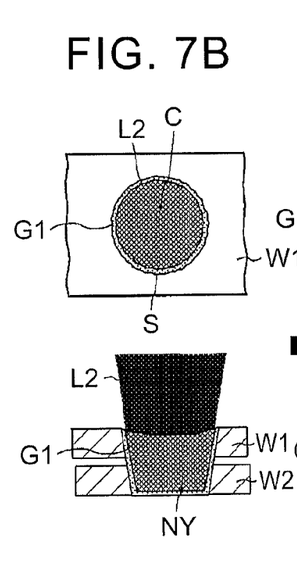
FIGS. 7B to 7D are schematic views for illustrating the second laser beam irradiation process according to the laser welding method of the modified example of the third embodiment and show that the second laser beam is projected onto the workpieces in order.
Figure 7C:
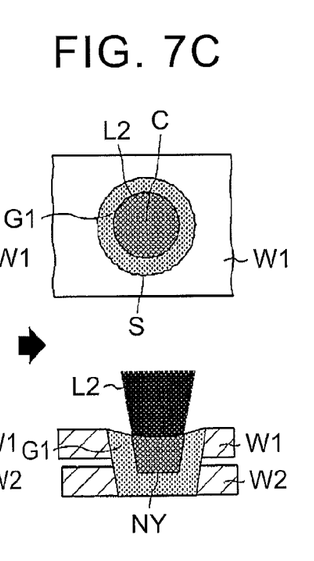
Figure 7D:
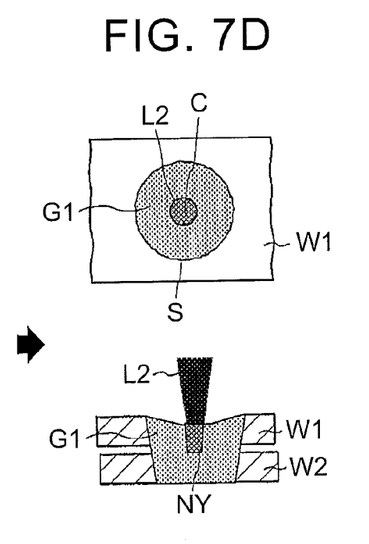
Figure 7E:
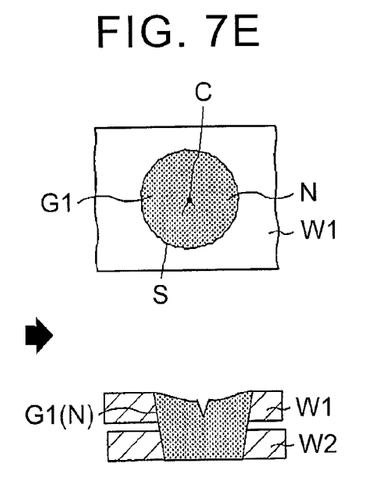
FIG. 7E is a schematic view for illustrating the second laser beam irradiation process according to the laser welding method of the modified example of the third embodiment and shows a weld section after the irradiation of the second laser beam.

FIG. 7 includes schematic views for illustrating the second laser beam irradiation process according to the laser welding method of a modified example of the third embodiment, in which FIG. 7A is a view for illustrating the irradiation of the second laser beam, in which FIG. 7B to FIG. 7D show that the second laser beam is projected onto the workpieces in order, and in which FIG. 7E is a view of the welded portion after the irradiation of the second laser beam.

In the above-described embodiment, the second laser beam L2 is scanned on the nugget NY in the melted state. For example, as shown in FIG. 7A, a position of a focal point of the second laser beam L2 may be adjusted so as to adjust the irradiation region of the second laser beam L2 with respect to the workpieces. In this case, the irradiation region (an irradiation area) can be adjusted by moving a condenser lens of the second laser beam L2 at a high speed. Here, the second laser beam L2 is projected from a position T2 (T2') as a defocused position to a focused position of T1 while output of the laser beam is adjusted such that intensity thereof becomes constant, for example.

More specifically, as shown in FIG. 7B, the irradiation start region is set as a region that is surrounded by the peripheral edge S of the nugget NY in the melted state. Then, as shown in FIGS. 7B to 7D, the second laser beam is focused on the nugget NY in conjunction with progression of the solidification in the direction from the peripheral edge S toward the center C of the nugget NY in the melted state. In this way, the progression of the solidification in the direction from the peripheral edge S toward the center C of the nugget NY in the melted state can be delayed such that the columnar crystal structure G1 grows from the peripheral edge S to the center C of the nugget NY in the melted state.

Figures 8A, 8B:
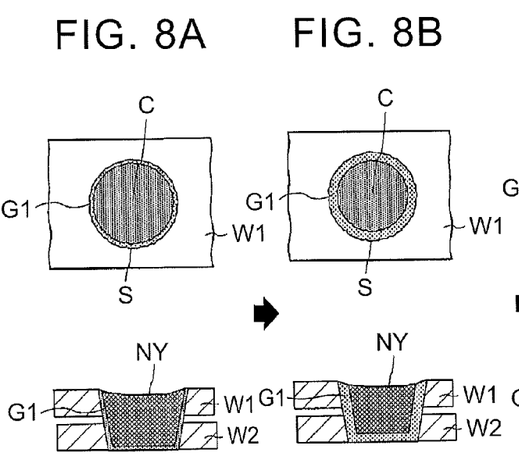
FIGS. 8A and 8B are schematic views for illustrating the second laser beam irradiation process according to the laser welding method of yet another modified example of the third embodiment and views of a change in solidification of the nugget in the melted state.
Figure 8C:
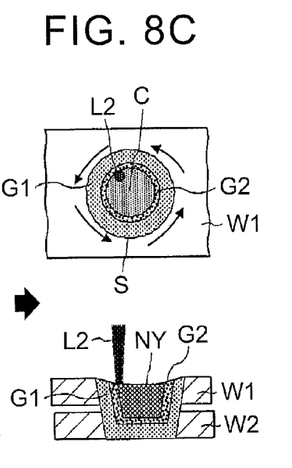
FIGS. 8C and 8D are schematic views for illustrating the second laser beam irradiation process according to the laser welding method of another modified example of the third embodiment and show that the second laser beam is projected onto the workpieces in order.
Figure 8D:
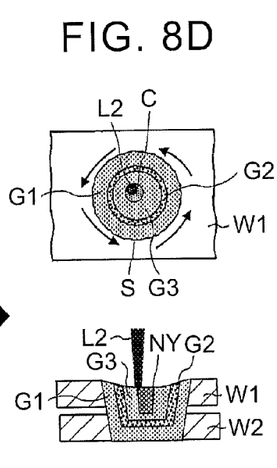
Figure 8E:
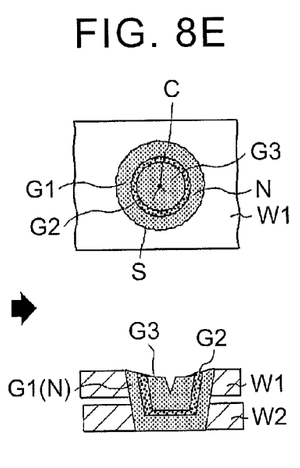
FIG. 8E is a schematic view for illustrating the second laser beam irradiation process according to the laser welding method of another modified example of the third embodiment and shows the solidified nugget after the irradiation of the second laser beam.

FIG. 8 includes schematic views for illustrating the second laser beam irradiation method according to the laser welding method of yet another modified example of the third embodiment, in which FIG. 8A and FIG. 8B show a change in solidification of the nugget in the melted state, in which FIG. 8C and FIG. 8D show that the second laser beam is projected onto the workpieces in order, and in which FIG. 8E is a view of the solidified nugget after the irradiation of the second laser beam This modified example differs from the above-described modified example in the irradiation start position of the second laser beam L2 and the timing.

In this modified example, in the second laser beam irradiation process, the irradiation start position is located between the peripheral edge S and the center C of the nugget NY in the melted state (see FIG. 8C, for example). Here, in this embodiment, in a period between the first laser beam irradiation process and the irradiation of the second laser beam (see FIG. 8C), as shown in FIG. 8A and FIG. 8B, the columnar crystal structure G1 grows from the peripheral edge S toward the center C of the nugget NY in the melted state in a manner to surround the center C thereof in conjunction with the progression of the solidification.

Next, the equiaxed crystal structure G2 has grown to the columnar crystal structure G1, as shown in FIG. 8C, the second laser beam irradiation process is started. In the second laser beam irradiation process, the second laser beam L2 is projected such that the equiaxed crystal structure G2 remains to surround the center C of the nugget NY in the melted state and that the columnar crystal structure grows from the equiaxed crystal structure G2 to the center C.

Just as described, as shown in FIG. 8E, in the solidified nugget N, a first columnar crystal region composed of the columnar crystal structure G1 is formed in the direction from the peripheral edge S toward the center C of the solidified nugget N. In the columnar crystal structure G1, the columnar crystal extends from the peripheral edge S. Then, the equiaxed crystal region that is formed of the equiaxed crystal structure G2 is formed to surround the center C of the nugget N from the first columnar crystal region (the columnar crystal structure G1). Furthermore, the second columnar crystal region that is formed of a columnar crystal structure G3 is formed from the equiaxed crystal region (the equiaxed crystal structure G2) to the center C of the nugget N. In the columnar crystal structure G3, the columnar crystal extends toward the center C of the nugget N.

Accordingly, even when a crack that starts from the center C is generated in the columnar crystal structure of the second columnar crystal region (the columnar crystal structure G3) during the solidification, the extension of the crack can be reduced. It is because the growth of the columnar crystal is intermittent. In addition, even when the crack further extends, this crack can be stopped by the equiaxed crystal structure G2 of the equiaxed crystal region. As a result, the extension of the crack can be suppressed.

5. A Relationship Between Formation of the Weld Section (Plural Nuggets) and the Second Laser Beam Irradiation Process FIG. 9 includes views for illustrating the laser welding method according to the third embodiment, in which FIG. 9A is a view of the virtual closed curve on the workpiece before the first laser beam is projected thereon and irradiation regions of the first laser beam, in which FIG. 9B is a view of a relationship between each of the irradiation regions and the total amount of input heat in the first and second laser beam irradiation processes, and FIG. 9C shows states of the nuggets.

Figure 9A:
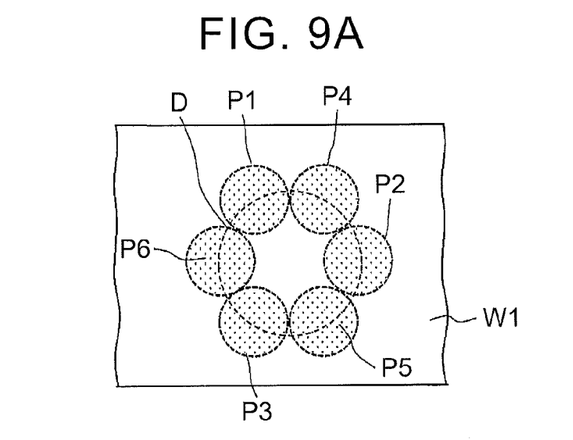
FIG. 9A is a view for illustrating the laser welding method according to the third embodiment and shows a virtual closed curve on the workpiece before the first laser beam is projected thereon and irradiation regions of the first laser beam.
Figure 9B:
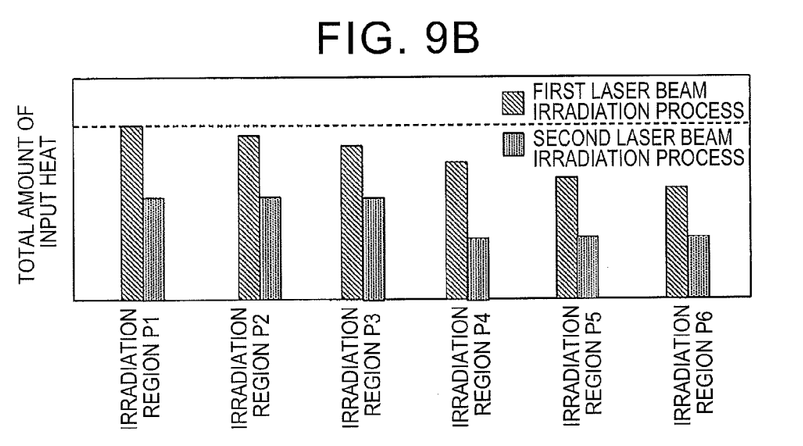
FIG. 9B is a view for illustrating the laser welding method according to the third embodiment and shows a relationship between each of the irradiation regions and a total amount of the input heat thereto in the first and the second laser beam irradiation processes.
Figure 9C:
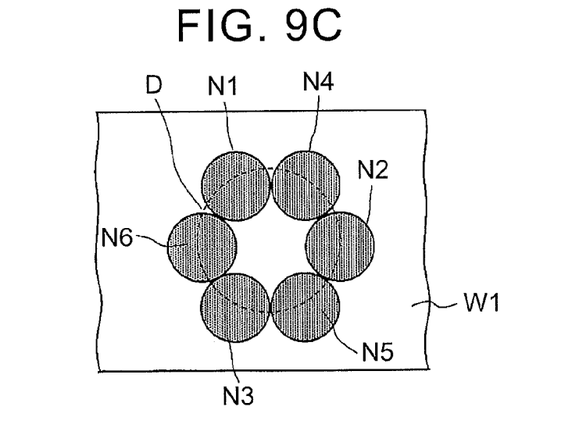
FIG. 9C is a view for illustrating the laser welding method according to the third embodiment and shows states of the nuggets.

Similar to the second embodiment, also in the embodiment, as shown in FIGS. 9A and 9C, the first laser beam L1 is projected onto the irradiation regions P1 to P6 in order to form the nuggets N1 to N6 in order. In addition, the first laser beam L1 is projected such that the amount of input heat from the first laser beam L1 that is projected onto the irradiation regions P1 to P6 to the workpiece W1 is reduced as the nuggets N1 to N6 are sequentially formed in order. Thus, the detailed description of this point will not be made.

As described above, this embodiment differs in a point that the second laser beam irradiation process is provided. In this embodiment, after the first laser beam irradiation process that is performed to form the nuggets N1 to N6, the second laser beam irradiation process is performed with respect to the corresponding nuggets N1 to N6. More specifically, after the first laser beam is projected onto the first irradiation region P1, the second laser beam is projected onto the nugget N1 that is formed in the region. Next, the first laser beam L1 is projected onto the second irradiation region P2, and then the second laser beam is projected onto the nugget N2 that is formed in the region. This routine is sequentially performed. Noted that, in this embodiment, the second laser beam irradiation process is performed after each of the nuggets is formed. However, as long as the conditions described in the third embodiment can be satisfied, the second laser beam irradiation process may be performed on each of the nuggets N1 to N6 after all of the nuggets N1 to N6 are formed.

Here, a purpose of irradiation of the second laser beam in the second laser beam irradiation process is to delay progression of the solidification in the direction toward the center of the nugget. Accordingly, as shown in FIG. 9B, the amount of input heat from the second laser beam L2, which is projected onto each of the irradiation regions (specifically, each of the nuggets in the melted state), to the workpiece is smaller than the amount of input heat from the first laser beam L1, which is projected onto each of the corresponding irradiation regions, to the workpiece. In addition, the remaining amount of heat by the first and the second laser beams that are projected onto the irradiation regions P1 to P3 are added to the amount of input heat from the second laser beam L2 that is projected onto the irradiation regions P4 to P6. Thus, the amount of input heat from the second laser beam L2 that is projected onto the irradiation regions P4 to P6 may be smaller than the amount of input heat from the second laser beam L2 that is projected onto the irradiation regions P1 to P3.

The detailed description has been made so far by using the embodiments of the invention. Specific configurations thereof are not limited to these embodiments and examples, and any design changes that are made within the scope of the gist of the invention are included in the invention.

What is claimed is:

1. A laser welding method comprising:
projecting a laser beam onto irradiation regions on plural metallic workpieces such that a weld section is formed when the workpieces are joined by laser welding, the weld section being formed of plural nuggets, and the irradiation regions being respectively formed with the nuggets; wherein
the nuggets are sequentially formed by sequentially projecting the laser beam onto the irradiation regions that respectively correspond to the nuggets, and
the laser beam is projected onto each of the irradiation regions such that an amount of input heat from the laser beam that is projected onto each of the irradiation regions to the workpieces is reduced as the nuggets are sequentially formed.

2. The laser welding method according to claim 1 wherein the laser beam is projected such that the plural nuggets are formed along a virtual closed curve.

3. The laser welding method according to claim 2 wherein the laser beam is projected such that the nuggets are separated from each other along the closed curve, and then the laser beam is projected such that the nugget is further formed on the closed curve between the two adjacent nuggets.

4. The laser welding method according to claim 1 wherein projecting the laser beam includes a first laser beam irradiation process to form the nuggets, and projecting the laser beam further includes a second laser beam irradiation process that is performed between the first laser beam irradiation process and solidification of the nugget and in which the laser beam is projected onto the nugget in a melted state, so as to delay progression of solidification in a direction from a peripheral edge of the nugget toward center of the nugget.

* * * * *